Jan. 12, 1954  M. W. RACE  2,665,516
SPIRAL FISH LURE
Filed April 10, 1951
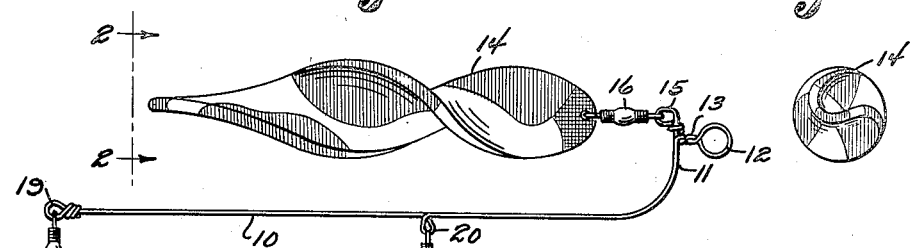
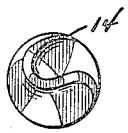
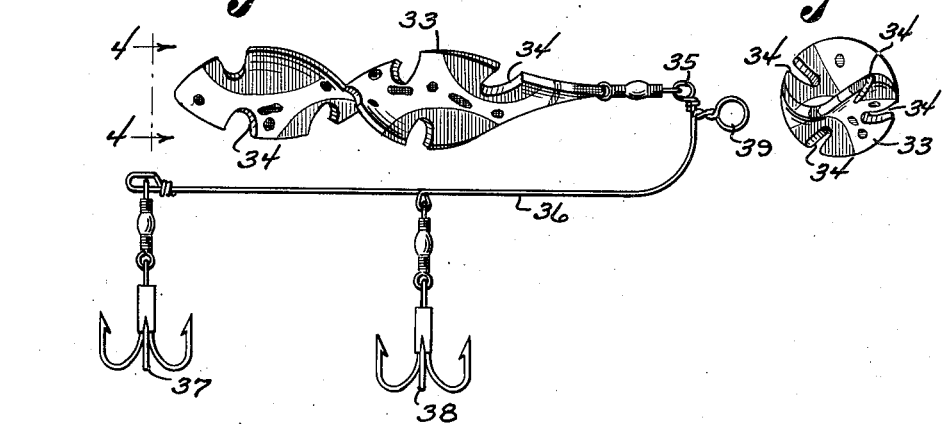
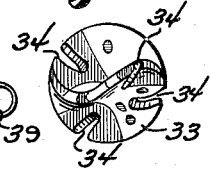
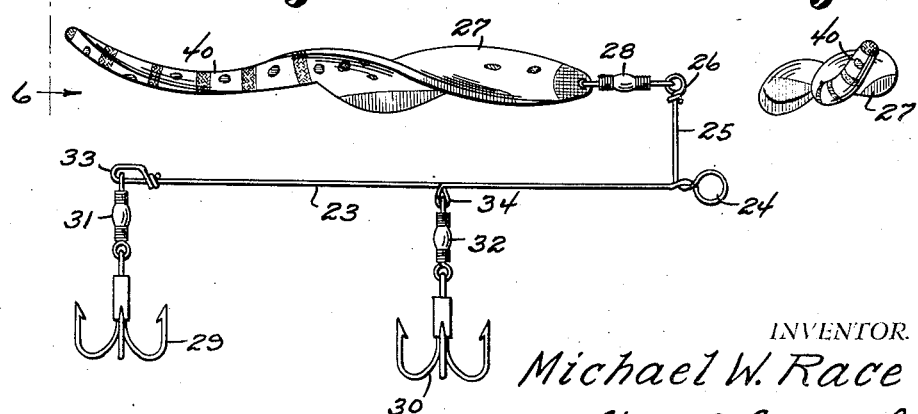
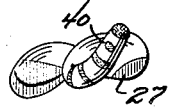
INVENTOR.
Michael W. Race
BY Victor J. Evans & Co.
ATTORNEYS Patented Jan. 12, 1954

2,665,516

UNITED STATES PATENT OFFICE 2,665,516

SPIRAL FISH LURE

Michael W. Race, Mansfield, Ohio

Application April 10, 1951, Serial No. 220,205

3 Claims. (Cl. 43—42.51)

This invention relates to fish lures particularly of the type used in trolling, and in particular a spiral spinner mounted through a swivel connection on the forward end of a hook carrying frame whereby the spinner rotates in a plane parallel to and spaced above the supporting bar of the frame and with hooks depending from the frame the hooks are positioned to be taken by a fish snapping at the spiral spinner.

The purpose of this invention is to provide an improved fish lure in which a fish attracting element is free to rotate independent of hooks suspended by a frame positioned below the element.

Fish lures have been provided with various types of spinning elements which, in the conventional type of lure are mounted to rotate about a shaft, however, in this type of lure it is necessary to suspend the hooks from the end of the spinning element and it is difficult to hold hooks at the sides of a spinning element without having the hooks swing around with the element. With this thought in mind this invention contemplates a lure having hooks depending from an L-shaped frame and with a spinner mounted through a swivel joint on the frame and adapted to rotate independent of the frame.

The object of this invention is, therefore, to provide means for mounting hooks at the side of a spinning element whereby the spinning element is free to rotate independent of the hooks.

Another object of the invention is to provide means for mounting a spiral spinning element on a fish lure whereby hooks may be mounted in substantially stationary positions at one side of the element or lure.

Another object of the invention is to provide means for mounting a spiral spinning element in a fish lure whereby the element is free to rotate independent of hook supporting means of the lure.

A further object of the invention is to provide a fish lure having a spiral spinner connected by a swivel joint to the forward end of a shaft from which hooks depend, which is of a simple and economical construction.

With these and other objects and advantages in view the invention embodies a frame having a horizontally disposed leg having gang hooks carried thereon with a line attaching eye at the forward end and with a spiral spinner pivotally connected to the said forward end and extended rearwardly therefrom.

Other features and advantages of the invention will appear from the following description taken in connection with the drawings wherein:

Figure 1 is a side elevational view illustrating the relative positions of the parts and with part of the forward end of the spinning element connected to the hook carrying frame by a spinner.

Figure 2 is an end elevational view taken from a point on line 2—2 of Figure 1 showing the trailing end of the spinner.

Figure 3 is a side elevational view similar to that shown in Figure 1 illustrating a modification wherein a spiral spinner having notches in the edges is used in place of the spinner shown in Figure 1.

Figure 4 is an end elevational view taken on line 4—4 of Figure 3 showing the trailing end of the spinning element shown in Figure 3.

Figure 5 is a side elevational view, similar to that shown in Figure 1, showing a spinning element of a still further design and showing a modification wherein the line attaching eye is positioned at the forward end of the shaft of the frame.

Figure 6 is an end view taken on line 6—6 of Figure 5 and also showing the trailing end of the spiral spinning element.

Referring now to the drawings wherein like reference characters denote corresponding parts the improved spiral spinner fish lure of this invention includes a frame having a shaft 10 and an upwardly extended end 11, with a line attaching eye 12 extended from the end 11 of the frame and connected thereto by a twisted extension 13, a spiral spinner 14 connected to an eye 15 on the upper end of the end 11 through a swivel joint or connection 16 and gang hooks 17 and 18 connected to eyes 19 and 20, on the shaft 10 of the frame through connections 21 and 22, respectively.

The supporting frame is preferably formed of comparatively fine wire with one end twisted to form the eye 19, with the intermediate part formed to provide the eye 20, and with the forward end twisted to form the eyes 12 and 15.

In the design shown in Figure 5 the frame is formed with a shaft 23, similar to the shaft 10 and in this design a line attaching eye 24 is positioned at the forward end of the shaft with a vertical section 25 extended upwardly therefrom and with an eye 26 at the upper end to which a lure 27 is attached by a swivel 28. Gang hooks 29 and 30 are also attached to the shaft 23 by swivels 31 and 32 which are supported in eyes 33 and 34, respectively.

The design illustrated in Figure 3 is similar to that shown in Figure 1 except that a spinner 33 which is also twisted to form a spiral is provided with notches 34 in the edges and the forward end of this spinner is connected to an eye 35 in the forward end of a shaft 36 from which gang hooks 37 and 38 are suspended and which is provided with a line attaching eye 39 at the forward end.

The spinner 27 illustrated in Figure 5 is provided with a body section, and a tail 40 extends from the trailing end.

The spiral spinner may be provided in various types and designs and with the forward end attached to an upwardly extended section of the frame from which the hooks depend. The spiral spinner rotates as the lure is drawn through the water by a line attached to the line attaching eye on the leading end and with the elements spinning, the hooks are suspended below the intermediate part and trailing end thereof.

It will be understood that other modifications may be made in the design and arrangement of the parts without departing from the spirit of the invention.

What is claimed is:

1. In a fish lure, the combination which comprises an L-shaped wire supporting frame having a long leg and a short arm with eyes on the ends of the leg and arm and with a line attaching eye extended from the arm, said leg having an eye intermediate of the length thereof, gang hooks depending from the long leg of the frame, and a freely movable spiral spinning element extended from the short arm of the frame.

2. In a fish lure, the combination which comprises an L-shaped wire supporting frame having a long leg and a short arm with eyes on the ends of the leg and arm and with a line attaching eye extended from the arm, said leg having an eye intermediate of the length thereof, gang hooks connected to and depending from the long leg of the frame, and a freely movable spiral spinning element connected to and extended from the short arm of the frame, the connections of the gang hooks and spiral spinning element to the frame having swivel members therein.

3. A fish lure comprising a longitudinally disposed wire shaft having a straight section and a section extended from one end of the straight section at right angles thereto, a first eye on the free end of the said extended section, a second eye on said extended section adjacent said first eye for attachment thereto of a fishing line, a third eye at the other end of said straight section, said straight section having a fourth eye intermediate said second and third eyes, hooks attached to said third and fourth eyes, and a spiral spinning element positioned to rotate in a plane perpendicular to said extended section and attached to said first eye by means of a swivel.

MICHAEL W. RACE.

References Cited in the file of this patent

UNITED STATES PATENTS

| Number | Name | Date |
|---|---|---|
| 171,768 | Buel | Jan. 4, 1876 |
| 1,256,155 | O'Brien | Feb. 12, 1918 |
| 1,948,823 | Lissy | Feb. 27, 1934 |
| 2,001,055 | De Witt | May 14, 1935 |
| 2,471,499 | Shipman | May 31, 1949 |
| 2,476,126 | Weiss | July 12, 1949 |
| 2,541,397 | Wisener et al. | Feb. 13, 1951 |

FOREIGN PATENTS

| Number | Country | Date |
|---|---|---|
| 14,525 | Great Britain | July 14, 1905 |
| 363,301 | Great Britain | Dec. 17, 1931 |